United States Patent
Inaba

(10) Patent No.: US 9,539,880 B2
(45) Date of Patent: Jan. 10, 2017

(54) AIR CONDITIONER FOR VEHICLE

(75) Inventor: Atsushi Inaba, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 400 days.

(21) Appl. No.: 14/117,804

(22) PCT Filed: Jun. 12, 2012

(86) PCT No.: PCT/JP2012/003803
§ 371 (c)(1),
(2), (4) Date: Nov. 14, 2013

(87) PCT Pub. No.: WO2013/005373
PCT Pub. Date: Jan. 10, 2013

(65) Prior Publication Data
US 2014/0117104 A1 May 1, 2014

(30) Foreign Application Priority Data
Jul. 5, 2011 (JP) .................. 2011-149483

(51) Int. Cl.
*B60H 1/03* (2006.01)
*B60H 1/02* (2006.01)
(Continued)

(52) U.S. Cl.
CPC ............ *B60H 1/02* (2013.01); *B60H 1/00899* (2013.01); *B60H 1/03* (2013.01);
(Continued)

(58) Field of Classification Search
CPC ......... B60H 1/02; B60H 1/00899; B60H 1/04; B60H 1/03; B60H 2001/00928; B64D 13/08; B64D 2700/62973
(Continued)

(56) References Cited

U.S. PATENT DOCUMENTS 6,383,672 B1 * 5/2002 Fujita .................. H01M 2/1022
165/297
6,598,671 B1 * 7/2003 Zeng .................. B60H 1/00735
165/202
(Continued)

FOREIGN PATENT DOCUMENTS

DE 102007016298 10/2007
EP 1 726 461 11/2006
(Continued)

OTHER PUBLICATIONS

"DE_102007016298_A1_M-Machine Translation.pdf", Machine Translation, EPO, Mar. 30, 2016.*
(Continued)

*Primary Examiner* — Gregory Huson
*Assistant Examiner* — Daniel E Namay
(74) *Attorney, Agent, or Firm* — Harness, Dickey & Pierce, P.L.C.

(57) ABSTRACT

An air-conditioner for a vehicle includes: a heater core which heats air for air-conditioning by using cooling water of a cooling circuit which cools a fuel cell of a fuel cell vehicle or an engine of a hybrid car as a heat source; a heat exchanger arranged upstream of the heater core in a flow of the air for air-conditioning to heat the air for air-conditioning by using refrigerant which flows through a heat pump cycle as a heat source; and a control part which controls operation of the heat pump cycle in a manner that a target temperature of the air for air-conditioning heated by the heat exchanger is changed in accordance with a temperature of the cooling water.

7 Claims, 4 Drawing Sheets

(51) Int. Cl.
  *B60H 1/00* (2006.01)
  *B60H 1/12* (2006.01)
  *B64D 13/08* (2006.01)

(52) U.S. Cl.
  CPC .... *B60H 2001/00928* (2013.01); *B64D 13/08* (2013.01); *B64D 2700/62973* (2013.01)

(58) Field of Classification Search
  USPC ... 237/28, 34, 5, 8 A, 8 D, 8 R, 2 B, 12.3 B, 237/59
  IPC .......................... B60H 1/03,1/12; B64D 13/08
  See application file for complete search history.

(56) References Cited

U.S. PATENT DOCUMENTS

| | | | | |
|---|---|---|---|---|
| 6,640,570 | B2* | 11/2003 | Nishida | B60H 1/00064 165/42 |
| 6,695,743 | B2* | 2/2004 | Tanaka | B60H 1/03 165/42 |
| 7,069,983 | B2* | 7/2006 | Yakumaru | B60H 1/004 165/202 |
| 2001/0013409 | A1* | 8/2001 | Burk | B60H 1/025 165/240 |
| 2004/0011068 | A1 | 1/2004 | Hatakeyama | |
| 2005/0241818 | A1* | 11/2005 | Yakumaru | B60H 1/004 165/202 |
| 2008/0041071 | A1* | 2/2008 | Itoh | B60H 1/00342 62/79 |
| 2008/0229768 | A1 | 9/2008 | Nakamura et al. | |
| 2011/0048671 | A1 | 3/2011 | Nishikawa et al. | |
| 2014/0117104 | A1* | 5/2014 | Inaba | B60H 1/00899 237/28 |

FOREIGN PATENT DOCUMENTS

| | | | |
|---|---|---|---|
| JP | 62053213 | A * | 3/1987 |
| JP | 01289710 | A * | 11/1989 |
| JP | 05139147 | A * | 6/1993 |
| JP | 06080010 | A * | 3/1994 |
| JP | 06135221 | A * | 5/1994 |
| JP | 06239131 | A * | 8/1994 |
| JP | 2002-046457 | A | 2/2002 |
| JP | 2003-335129 | A | 11/2003 |
| JP | 2009-051475 | A | 3/2009 |
| JP | 2010-282808 | A | 12/2010 |
| JP | 2011-073668 | A | 4/2011 |

OTHER PUBLICATIONS

International Search Report for PCT/JP2012/003803, ISA/JP, mailed Sep. 4, 2012.
Written Opinion of the ISA for PCT/JP2012/003803, ISA/JP, mailed Sep. 4, 2012.
Office action dated Dec. 3, 2013 in corresponding Japanese Application No. 2011-149483.
Office action dated Dec. 1, 2015 in corresponding German Application No. 112012002819.8.

* cited by examiner

AIR CONDITIONER FOR VEHICLE

CROSS REFERENCE TO RELATED APPLICATION

This application is a 371 National Phase of PCT/JP2012/003803 filed Jun. 12, 2012, based on Japanese Patent Application No. 2011-149483 filed on Jul. 5, 2011, the disclosures of which are incorporated herein by reference.

TECHNICAL FIELD

This application relates to an air-conditioner for a vehicle in which waste heat of, for example, a fuel-cell vehicle or a hybrid car is utilized for a heating operation.

BACKGROUND ART

Usually, a fuel cell has an optimal range for the operation temperature (for example, the maximum power generation efficiency can be obtained at the temperature) according to characteristic of the fuel cell. In order to control the operation temperature of the fuel cell within the optimal range, the temperature of the cooling fluid of the fuel cell is required to be controlled within a predetermined range.

From this, for example, in a fuel cell system of Patent document 1, when a heating operation is performed in the vehicle, a fuel cell cooling circuit is connected to an air-conditioning circuit. When the cooling water of the fuel cell cooling circuit is used for the heating operation, the heat generating amount and the heat emitting amount are controlled to be balanced in the fuel cell system. For example, when the heat generating amount is small, an electric heater is activated to complement the insufficiency in the heat generating amount, such that the temperature of the cooling water of the fuel cell cooling circuit is restricted from having large variation (large decreasing). Furthermore, the temperature of the cooling water is detected at the outlet side of the fuel cell. Based on this outlet temperature, the heat generating amount in the fuel cell system is controlled, or the fuel cell cooling circuit is connected to or disconnected from the air-conditioning circuit, such that the temperature of the cooling water of the fuel cell cooling circuit is controlled within the predetermined range.

Moreover, Patent document 2 is known as a conventional air-conditioner for a vehicle. The air-conditioner of Patent document 2 is applied to a vehicle which has a fuel cell as a drive source, and includes a heater core which heats air for air-conditioning by using the cooling water of the fuel cell as a heat source, and a first indoor unit and a second indoor unit which heat the air for air-conditioning by using high-temperature refrigerant of a heat pump equipment as a heat source. The heater core, the first indoor unit, and the second indoor unit are arranged in an air-conditioning case, in order of the second indoor unit, the heater core, and the first indoor unit from the upstream side to the downstream side in the flow of the air for air-conditioning.

When the temperature of the cooling water of the fuel cell is higher than a reference temperature, and when the passenger compartment is heated (at a heating operation mode), the air for air-conditioning is heated as follows. That is, when the temperature of the cooling water exceeds the target blow-off temperature of air blown-off into the passenger compartment by +5° C. or more, the heat pump equipment is suspended, and the air for air-conditioning is heated only with the heater core.

On the other hand, when the temperature of the cooling water is less than the value calculated by adding +5° C. to the target blow-off temperature of air, the heat pump equipment is operated, and the air for air-conditioning is heated using the first indoor unit, the second indoor unit, and the heater core. In this case, the air for air-conditioning heated by the heater core can be further heated with the first indoor unit. Even when the temperature of the cooling water is low, the cooling water can be used as a heat source for heating.

Moreover, the temperature of the cooling water of the fuel cell is lower than the reference temperature, the fuel cell is operated to be warmed (at a warm-up operation mode). At this time, high-temperature refrigerant is made to flow in the second indoor unit, thereby heating the heater core, i.e., the cooling water of the fuel cell, at the downstream side.

However, in the fuel cell system of Patent document 1, when the heat generating mount is shorted in the fuel cell system, the shortage is complemented by the electric heater, so the efficiency is low. Further, the drive mileage of the vehicle is reduced since the electric power of the fuel cell is used.

Moreover, in the air-conditioner of Patent document 2, the two indoor units are needed, so it is difficult to arrange the two indoor units in the air-conditioning case.

Moreover, the air-conditioner of Patent document 2 does not have a concept that the temperature of the cooling water of the fuel cell is controlled within the predetermined range. Heat is emitted from the heater core while the combination of the heater core, the first indoor unit and the second indoor unit is determined so as to meet the target blow-off temperature for the passenger compartment. Therefore, when the heat core performs excessive heat emitting, the temperature of the cooling water cannot be kept constant.

Moreover, at the warm-up operation mode of the air-conditioner of Patent document 2, the second indoor unit can heat the cooling water of the heater core. However, the temperature of the air for air-conditioning is lowered when passing the heater core after heated by the second indoor unit. Thus, the low-temperature air will be blown off into the passenger compartment, and an occupant of the vehicle feels uncomfortable.

PRIOR ART DOCUMENT

Patent Document

Patent document 1: JP 2010-282808A
Patent document 2: JP 2009-51475A

SUMMARY OF THE INVENTION

It is an objective of the present application to provide an air-conditioner for a vehicle which enables suitable air-conditioning with simple structure while effectively using a small amount of waste heat output from a fuel cell or an engine for a hybrid car such that the temperature of the fuel cell or the engine can be kept constant.

According to an aspect of the present disclosure, an air-conditioner for a vehicle includes a heater core, a heat exchanger and a control part. The heater core heats air for air-conditioning by using cooling water of a cooling circuit which cools a fuel cell of a fuel-cell vehicle or an engine of a hybrid car as a heat source. The heat exchanger is arranged upstream of the heater core in a flow direction of the air for air-conditioning, and heats the air for air-conditioning by using refrigerant flowing through a heat pump cycle as a heat source. The control part controls operation of the heat pump cycle in a manner that a target temperature of the air for air-conditioning heated by the heat exchanger is changed in accordance with a temperature of the cooling water.

According to the disclosure, the heater core and the heat exchanger are prepared as a heating portion which heats the air for air-conditioning. Then, the control part controls the operation of the heat pump cycle such that the target heating temperature in the heat exchanger is changed according to the temperature of the cooling water. The control part changes the target heating temperature in the heat exchanger relative to the heating capability of the heater core obtained according to, for example, the temperature of the cooling water, thereby compensating the shortage in the heating capability of the heater core by using the heat exchanger, such that it becomes possible to secure the need heating performance by the heater core and the heat exchanger.

Therefore, in the heater core, what is necessary is just to heat the air for air-conditioning according to the temperature of the cooling water, so the temperature of the cooling water can be kept constant without emitting excessive amount of heat from the cooling water for the heating operation. That is, the temperature of the fuel cell or the engine can be kept constant.

In addition, even in a case where the heating capability with the heater core is not fully acquired, for example, depending on the temperature of the cooling water, the heating performance is securable by changing the target heating temperature in the heat exchanger such that the cooling water in the heater core is heated with the air for air-conditioning which was heated by the heat exchanger.

Thus, by changing the target heating temperature according to the temperature of the cooling water, the needed heating performance is securable by two heating portions, i.e., the heater core and the heat exchanger, so the structure can be made simple compared with Patent document 2 which needs three heating portions means (two indoor units and one heater core).

Therefore, by the air-conditioner, suitable air-conditioning can be performed with the simple composition by effectively using a small amount of waste heat output from the fuel cell or the engine of the hybrid car, such that the temperature of the fuel cell or the engine can be kept constant.

For example, a bypass channel is provided in the cooling circuit, and the cooling water bypasses the heater core by flowing through the bypass channel. The control part controls the cooling water to flow through the bypass channel, when the temperature of the cooling water is lower than a heating possible temperature at which the heater core is possible to perform a heating operation.

According to the disclosure, when the temperature of the cooling water is lower than the heating possible temperature, the cooling water is made to flow through the bypass channel in the cooling circuit. At this time, the cooling water does not flow in the heater core. Therefore, heating of the air for air-conditioning is performed by only the heat exchanger. Since the heat of the cooling water is not emitted to the air for air-conditioning from the heater core, the temperature of the cooling water can be kept constant. That is, the temperature of the fuel cell or the engine can be kept constant.

For example, when the temperature of the cooling water is higher than the heating possible temperature, the control part lowers the target temperature as the temperature of the cooling water becomes higher at least in a first predetermined temperature range. When the temperature of the cooling water is lower than the heating possible temperature, the control part raises the target temperature as the temperature of the cooling water becomes lower at least in a second predetermined temperature range.

According to the disclosure, when the temperature of the cooling water is higher than the heating possible temperature, the control part lowers the target temperature as the temperature of the cooling water becomes higher at least in a first predetermined temperature range. That is, the heating capability of the heater core is mainly utilized, and only the insufficiency is complemented by the heat exchanger, such that it becomes possible to secure the need heating performance by the heater core and the heat exchanger.

On the contrary, when the temperature of the cooling water is lower than the heating possible temperature, the control part raises the target temperature as the temperature of the cooling water becomes lower at least in a second predetermined temperature range. That is, the heating capability acquired by the heater core is utilized as it is, and the insufficiency is complemented by the heat exchanger, such that it becomes possible to secure the need heating performance by the heater core and the heat exchanger.

For example, the control part sets the target temperature as the same value as the temperature of the cooling water when the temperature of the cooling water is lower than the heating possible temperature at which the heater core is possible to perform the heating operation.

According to the disclosure, the difference between the temperature of the air for air-conditioning heated by the heat exchanger and the temperature of the cooling water in the heater core can be eliminated. Therefore, when the temperature of the cooling water is lower than the heating possible temperature, the heat of the cooling water in the heater core is not emitted to the air for air-conditioning, so the heat of the cooling water can be maintained inside the cooling circuit. That is, the temperature of the fuel cell or the engine can be kept constant.

For example, the control part sets the target temperature as a value higher than the temperature of the cooling water when the temperature of the cooling water is lower than the heating possible temperature at which the heater core is possible to perform the heating operation.

According to the disclosure, the temperature of the air for air-conditioning heated by the heat exchanger can be always made higher than the temperature of the cooling water. Therefore, the cooling water in the heater core which is located downstream of the heat exchanger in the flow of the air for air-conditioning can be heated by the air for air-conditioning heated by the heat exchanger. That is, when the temperature of the cooling water is lower than the heating possible temperature, the low-temperature cooling water can be positively warmed.

BRIEF DESCRIPTION OF THE DRAWINGS

The above and other objects, features and advantages of the present disclosure will become more apparent from the following detailed description made with reference to the accompanying drawings. In the drawings.

EMBODIMENT TO PRACTICE THE INVENTION

Figure 1:
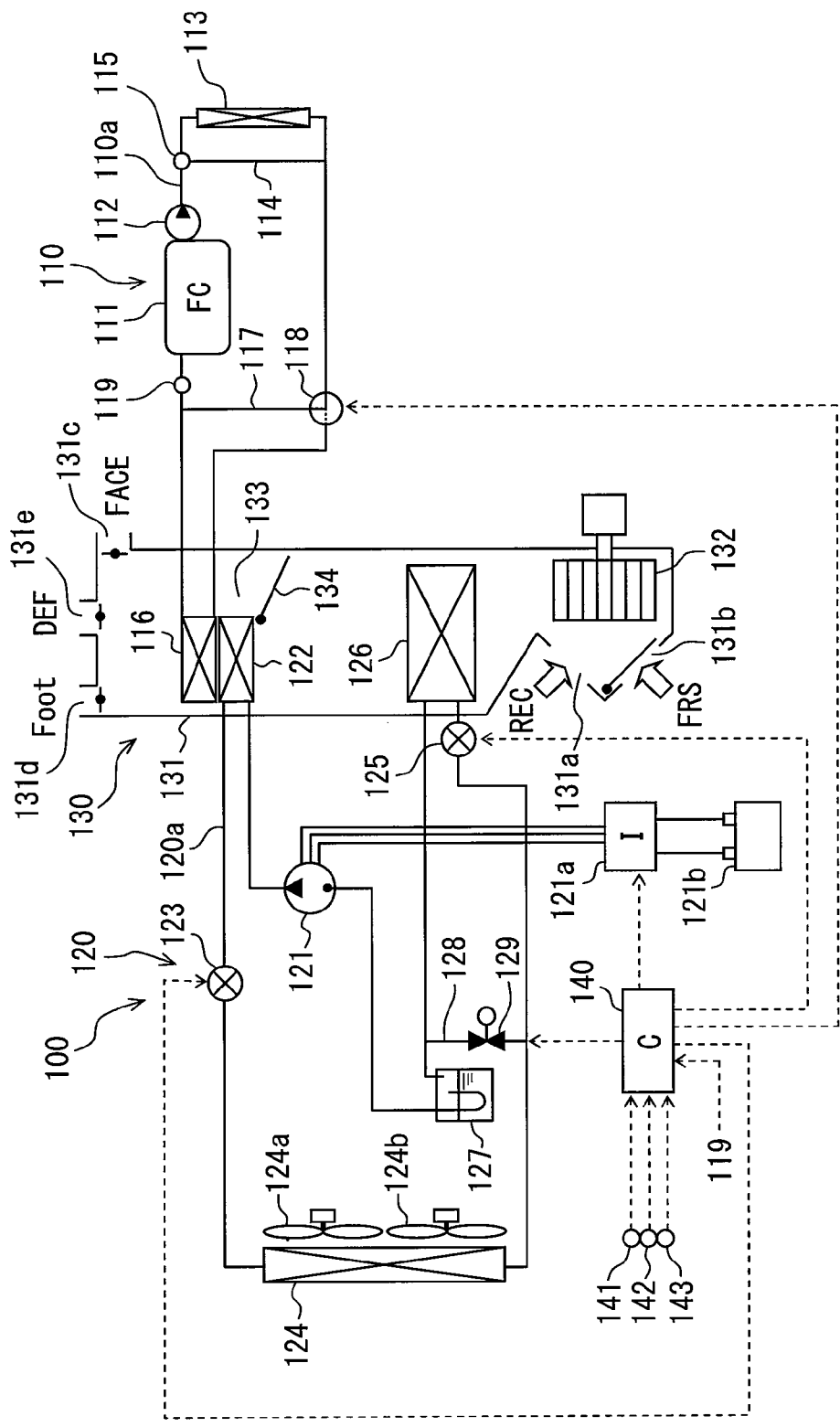
FIG. 1 is a diagram illustrating the whole of air-conditioner for a vehicle according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Hereafter, an air-conditioner 100 for a vehicle according to a first embodiment is explained with reference to FIGS. 1-4.

As shown in FIG. 1, the air-conditioner 100 is mounted to a fuel-cell vehicle (electric car EV) driven by, for example, a motor as a drive source. The vehicle includes a fuel cell 111 which supplies electric power to the motor. The air-conditioner 100 is equipped with a heater core 116 placed in a cooling circuit 110 which cools the fuel cell 111, a heat pump cycle 120, an indoor unit 130, and a control device 140.

The cooling circuit 110 is a circuit for cooling the fuel cell 111, and has a circulation passage 110a through which the cooling water circulates. The fuel cell 111, a pump 112, a radiator 113, a bypass channel 114, a switch valve 115, the heater core 116, a bypass channel 117, a switch valve 118, and a water temperature sensor 119 are arranged in the circulation passage 110a.

The fuel cell 111 is a battery which generates electric power using electrochemistry reaction between hydrogen and oxygen. The fuel cell 111 has an external casing and a fuel cell stack arranged in the external casing. The fuel cell stack includes plural cells connected in series. In the cell, a polyelectrolyte film is disposed between a plus pole and a minus pole. The fuel cell 111 needs to be maintained at a constant temperature (for example, lower than or equal to 80° C.) during the operation for securing a power generation efficiency. The cooling water can be circulated in the external casing of the fuel cell 111 as cooling medium. The circulating cooling water adjusts (cools) the temperature of the fuel cell 111 under operation to be lower than or equal to the constant temperature.

The pump 112 is an electromotive fluid machinery driven by an electric motor which is not illustrated. Due to the pump 112, the cooling water is circulated through the radiator 113 or the bypass channel 114, and also the heater core 116 or the bypass channel 117, in the circulation passage 110a.

The radiator 113 is a heat exchanger for emitting heat, and cools the cooling water after the temperature of the cooling water is raised by the fuel cell 111. For example, the radiator 113 is arranged ahead in the engine compartment behind the grill. The radiator 113 has a ventilation fan which is not illustrated. The radiator 113 cools the cooling water with air supplied by the ventilation fan.

The bypass channel 114 is a passage which bypasses the radiator 113 in the circulation passage 110a. The bypass channel 114 is branched from the circulation passage 110a on the cooling-water entrance side of the radiator 113, and is joined to the circulation passage 110a on the cooling-water outlet side of the radiator 113.

The switch valve 115 is a passage change portion which changes the cooling water in the cooling circuit 110 to flow into the radiator 113 or the bypass channel 114, and is located at a branch point where the bypass channel 114 is branched from the circulation passage 110a. The switch valve 115 has an internal valve. The cooling water flows through the radiator 113 when the bypass channel 114 is closed by the internal valve and when the passage connected to the radiator 113 is opened. In contrast, the cooling water flows through the bypass channel 114 when the bypass channel 114 is opened by the internal valve and when the passage connected to the radiator 113 is closed. Opening and closing of the internal valve of the switch valve 115 is controlled by the control device 140. In addition, the switch valve 115 may be made of a thermostat in which the opening degree of the internal valve is changed according to the temperature of the cooling water.

The heater core 116 is a heating portion for heating (heat exchanger for heating), and heats the air for air-conditioning passing inside an air-conditioning case 131 by using the cooling water as a heat source. The heater core 116 is placed on the downstream side in the flow of air for air-conditioning in the air-conditioning case 131. A cooling-water channel is defined inside the heater core 116. When the cooling water flows through the cooling-water channel, the heater core 116 emits the heat of cooling water to the air for air-conditioning which passes through the heater core 116, such that the air for air-conditioning is heated.

The bypass channel 117 is a passage which bypasses the heater core 116 in the circulation passage 110a. The bypass channel 117 is branched from the circulation passage 110a on the cooling-water entrance side of the heater core 116, and is joined to the circulation passage 110a on the cooling-water outlet side of the heater core 116.

The switch valve 118 is a passage change portion which changes the cooling water in the cooling circuit 110 to flow into the heater core 116 or the bypass channel 117, and is located at a branch point where the bypass channel 117 is branched from the circulation passage 110a. The switch valve 118 has an internal valve, similarly to the switch valve 115. The cooling water flows through the heater core 116 when the bypass channel 117 is closed by the internal valve and when the passage connected to the heater core 116 is opened. In contrast, the cooling water flows through the bypass channel 117 when the bypass channel 117 is opened by the internal valve and when the passage connected to the heater core 116 is closed. Opening and closing of the internal valve of the switch valve 118 is controlled by the control device 140.

The water temperature sensor 119 is a temperature detector to detect the temperature of the cooling water in the cooling circuit 110. The water temperature sensor 119 is arranged between the fuel cell 111 and the unification part of the circulation passage 110a and the bypass channel 117, and detects the temperature of the cooling water flowing out of the heater core 116 or the bypass channel 117. A temperature signal (henceforth, cooling water temperature) $T_{FC}$ of the cooling water detected by the water temperature sensor 119 is outputted to the control device 140.

Next, the heat pump cycle 120 is a thermal cycle for heating or cooling the passenger compartment. A compressor 121, an indoor heat exchanger 122, a first throttle 123, an outdoor heat exchanger 124, a second throttle 125, an evaporator 126, and an accumulator 127 are disposed in a refrigerant passage 120a through which refrigerant circulates. Moreover, a shut valve 129 is disposed in a branch channel 128.

Of the components 121-129 of the heat pump cycle 120, the indoor heat exchanger 122 and the evaporator 126 are located in the passenger compartment (inside an instrument panel) as components of the indoor unit 130 to be mentioned later. Other components (121, 123-127, 129) are located in the engine compartment where the motor of the vehicle is accommodated.

The compressor 121 is driven by an electric motor which is not illustrated, and is an electromotive fluid machinery which compresses refrigerant in the heat pump cycle 120 into high-temperature and high-pressure refrigerant to discharge. The discharge amount of refrigerant is controlled according to the rotation speed of the compressor 121. The electric power supplied from a battery 121b is controlled by an inverter 121a, such that the rotation speed and the discharge amount of refrigerant of the compressor 121 are controlled. The inverter 121a is controlled by the control device 140.

The indoor heat exchanger 122 is a heating portion for performing a heating operation (heat exchanger for heating) to heat the air for air-conditioning passing inside the air-conditioning case 131 by using the high-temperature and high-pressure refrigerant discharged from the compressor 121 as a heat source. The indoor heat exchanger 122 is arranged in the air-conditioning case 131 and is located adjacent to the heater core 116 at the upstream side in the flow of the air for air-conditioning. A refrigerant channel is defined inside the indoor heat exchanger 122. When refrigerant flows in the refrigerant channel, the indoor heat exchanger 122 emits the heat of refrigerant to the air for air-conditioning passing in the indoor heat exchanger 122, such that the air for air-conditioning is heated.

The first throttle 123 is a throttle part, and the opening degree is controllable from a full open degree to a predetermined throttle degree. When the first throttle 123 is set to have the full open degree, the opening area is the same as the cross-section area of the refrigerant passage 120a. The opening degree of the first throttle 123 is controlled by the control device 140.

In the outdoor heat exchanger 124, heat is exchanged between the refrigerant which flows out of the first throttle 123 and outside air for heat exchange. The outdoor heat exchanger 124 is arranged, for example, adjacently behind the radiator 113 in the engine compartment. In addition, electric fans 124a and 124b which supply the air for heat exchange to the radiator 113 and the outdoor heat exchanger 124 are located behind the outdoor heat exchanger 124 in the vehicle.

When a cooling operation is performed by the heat pump cycle 120, the first throttle 123 is controlled to have the full open degree, such that refrigerant which flows out of the indoor heat exchanger 122 flows into the outdoor heat exchanger 124 with the high-temperature and high-pressure, without being decompressed. Therefore, the outdoor heat exchanger 124 works as a heat exchanger for cooling which cools refrigerant by using the air for heat exchange. Moreover, when a heating operation is performed by the heat pump cycle 120, the first throttle 123 is controlled to have a predetermined throttle degree, such that refrigerant which flows out of the indoor heat exchanger 122 is decompressed to have low-temperature and low-pressure, and flows into the outdoor heat exchanger 124. Therefore, the outdoor heat exchanger 124 works as a heat exchanger for heat-absorbing which absorbs heat from the air for heat exchange.

The second throttle 125 is a decompressing portion which decompresses the refrigerant which flows out of the outdoor heat exchanger 124. The throttle degree of the second throttle 125 is controlled by the control device 140.

The evaporator 126 is a heat exchanger which cools the air for air-conditioning by exchanging heat between the refrigerant decompressed by the second throttle 125 and the air for air-conditioning passing inside the air-conditioning case 131. The evaporator 126 is disposed to cross the whole passage in the air-conditioning case 131. The evaporator 126 is located upstream of the indoor heat exchanger 122 in the flow of air for air-conditioning, in the air-conditioning case 131.

The accumulator 127 is a gas-liquid separator, which receives refrigerant which flows out of the evaporator 126 or refrigerant which flows through the branch channel 128 to be mentioned later. The refrigerant is separated into gas refrigerant and liquid refrigerant, and the liquid refrigerant is stored. The gas refrigerant and a small amount of the liquid refrigerant (in which oil has melted) near the bottom are drawn to the compressor 121.

The branch channel 128 is a passage which connects a passage between the outdoor heat exchanger 124 and the second throttle 125 to a passage between the evaporator 126 and the accumulator 127. The shut valve 129 which is able to open or close the branch channel 128 is disposed in the middle of the branch channel 128. The shut valve 129 is controlled to open or close the branch channel 128 by the control device 140.

Next, the indoor unit 130 controls the air for air-conditioning to have a preset temperature set by an occupant, and blows off the air for air-conditioning from selected blow-off ports 131c-131e into the passenger compartment. The indoor unit 130 includes a fan 132, the evaporator 126, the indoor heat exchanger 122, the heater core 116, and an air mixing door 134, in the air-conditioning case 131.

The fan 132 draws the air for air-conditioning into the air-conditioning case 131 from an inside air port 131a or an outside open port 131b of the air-conditioning case 131, so as to blow off the air from the blow-off port 131c-131e located the most downstream side into the passenger compartment, as a ventilation portion. The rotation speed of the fan 132, i.e., the air-sending amount, is controlled by the control device 140. The evaporator 126, the indoor heat exchanger 122, and the heater core 116 are arranged downstream side of the fan 132 in the flow of air for air-conditioning. Moreover, a bypass channel 133 is defined between the air-conditioning case 131, and the indoor heat exchanger 122 and the heater core 116, such that the air for air-conditioning can bypass the indoor heat exchanger 122 and the heater core 116 by flowing through the bypass channel 133.

The air mixing door 134 is a control portion to adjust the ratio of air amount passing the indoor heat exchanger 122 and the heater core 116 and air amount passing the bypass channel 133. The air mixing door 134 is a rotating door which opens or closes the air passage in the indoor heat exchanger 122 and the heater core 116, or the bypass channel 133. In response to the open degree of the air mixing door 134, the flow ratio is controlled between the heated air passing through the indoor heat exchanger 122 and the heater core 116, and the cooled air passing through the bypass channel 133 after cooled by the evaporator 126. Thus, the temperature of the air for air-conditioning downstream of the indoor heat exchanger 122 and the heater core 116 is adjusted. The open degree of the air mixing door 134 is controlled by the control device 140.

In the indoor unit 130, the downstream side of the indoor heat exchanger 122 and the heater core 116 is connected to the plural blow-off ports, i.e., face blow-off port 131c, foot blow-off port 131d, and defroster blow-off port 131e, toward the passenger compartment. The air for air-conditioning is blown off from the blow-off port selected among the blow-off ports 131c-131e toward the passenger compartment after the temperature is controlled by the air mixing door 134.

The control device 140 is a control part which consists of a microcomputer and its circumference circuit. The control device 140 performs calculations according to the program set up beforehand relative to the various temperature signals output from the water temperature sensor 119, an outside air temperature sensor 141, and an inside air temperature sensor 142, the solar radiation signal output from a solar radiation sensor 143, and the preset temperature signal set up by an occupant through a navigational panel which is not illustrated. Furthermore, the control device 140 controls the switch valve 115, the switch valve 118, the inverter 121a (of the compressor 121), the first throttle 123, the electric fans 124a and 124b, the second throttle 125, the shut valve 129, the fan 132, and the air mixing door 134 based on the calculation result, such that a cooling operation, a heating operation, and a warm-up operation are performed as follows.

Next, the operations based on the above-mentioned composition are described with reference to FIGS. 2-5.

First, operation at the time of cooling operation is explained.

The control device 140 computes a necessity blow-off temperature TAO based on the outside air temperature obtained from the outside air temperature sensor 141, the inside air temperature obtained from the inside air temperature sensor 142, the solar radiation amount obtained from the solar radiation sensor 143, and the preset temperature set up by the occupant. Then, the control device 140 selects the air for air-conditioning drawn into the air-conditioning case 131 (inside air or outside air), sets the rotation speed (air-sending amount) of the fan 132, sets the open degree of the air mixing door 134, and selects the blow-off port 131c-131e (face, foot, or defroster) in accordance with the necessity blow-off temperature TAO, in a manner that the temperature of the air for air-conditioning blown off into the passenger compartment becomes equal to the preset temperature set up by the occupant.

Next, the control device 140 closes the passage having the heater core 116 and opens the bypass channel 117, in the cooling circuit 110, by controlling the switch valve 118. Moreover, according to the cooling water temperature $T_{FC}$, the switch valve 115 is controlled to switch the passage. Moreover, in the heat pump cycle 120, the first throttle 123 is set to have the full open degree, the shut valve 129 is closed, and the compressor 121 and the electric fans 124a and 124b are activated.

Then, in the cooling circuit 110, the cooling water flows in order of the fuel cell 111, the pump 112, the radiator 113 (or the bypass channel 114 depending on the state of the switch valve 115), the bypass channel 117, and the fuel cell 111. Therefore, the cooling water is cooled by the radiator 113 and the fuel cell 111 is maintained to be cooled at a constant temperature. At this time, the cooling water does not flow through the heater core 116.

On the other hand, in the heat pump cycle 120, refrigerant flows in order of the compressor 121, the indoor heat exchanger 122, the first throttle 123, the outdoor heat exchanger 124, the second throttle 125, the evaporator 126, the accumulator 127, and the compressor 121.

At the time of cooling operation, the air mixing door 134 is rotated to mainly close the indoor heat exchanger 122, so most of the air for air-conditioning flows through the bypass channel 133. Thus, the refrigerant flowing inside the indoor heat exchanger 122 flows out of the indoor heat exchanger 122 with high-temperature and high-pressure, without radiating heat to the air for air-conditioning. Moreover, since the first throttle 123 is set to have the full open degree, the high-temperature and high-pressure refrigerant flowing out of the indoor heat exchanger 122 flows into the outdoor heat exchanger 124 without being decompressed by the first throttle 123, such that the refrigerant is cooled by the air for heat exchange.

Furthermore, the cooled refrigerant which flows out of the outdoor heat exchanger 124 is decompressed by the second throttle 125 to have low-temperature and low-pressure, and flows into the evaporator 126. The air for air-conditioning in the indoor unit 130 is cooled by the refrigerant which flows inside the evaporator 126, and the cooled air passes through the bypass channel 133 and is blown off from the selected blow-off port to the passenger compartment. At this time, the temperature of the air for air-conditioning is mainly adjusted by the air mixing door 134.

Next, operation at the time of heating operation is explained.

Similarly to the cooling operation, the control device 140 computes the necessity blow-off temperature TAO. Then, the control device 140 selects the air for air-conditioning drawn into the air-conditioning case 131 (inside air or outside air), sets the rotation speed (air-sending amount) of the fan 132, sets the open degree of the air mixing door 134, and selects the blow-off port 131c-131e (face, foot, or defroster) in accordance with the necessity blow-off temperature TAO, in a manner that the temperature of the air for air-conditioning blown off into the passenger compartment becomes equal to the preset temperature set up by the occupant.

Figure 2:
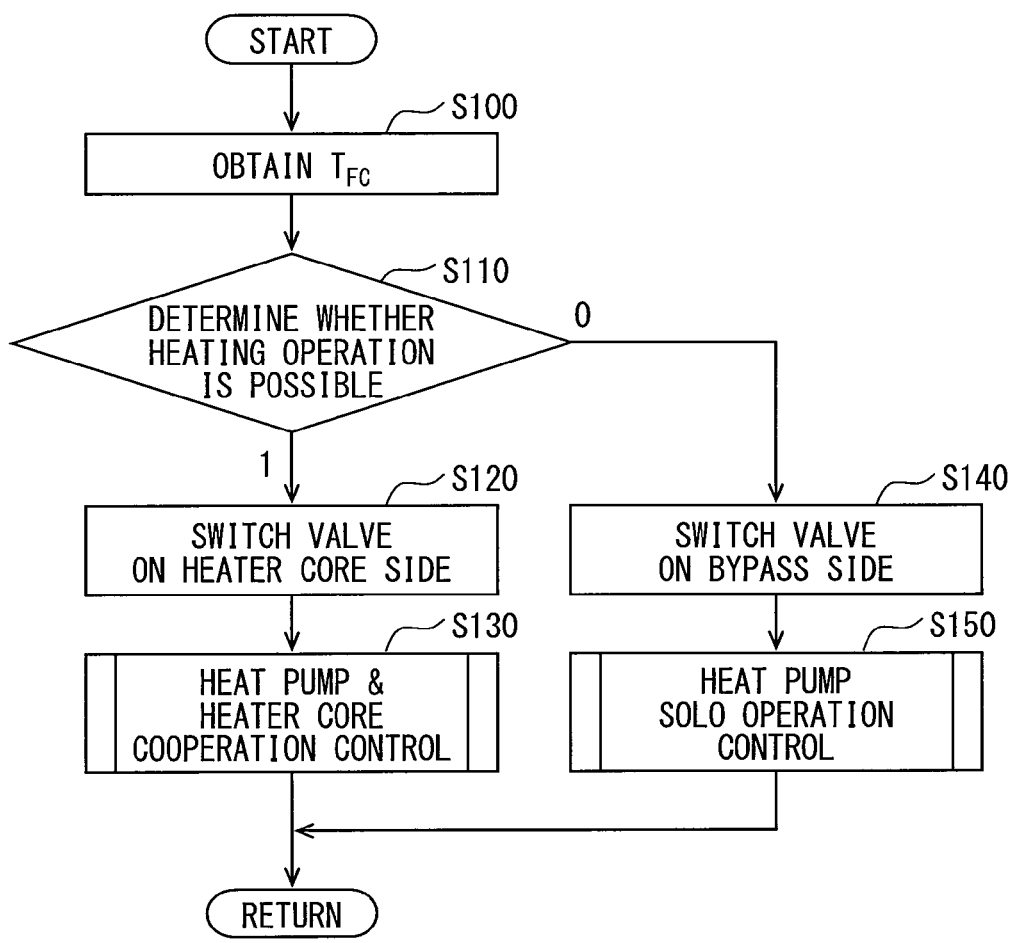
FIG. 2 is a control flow chart executed by a control device at a time of heating operation.
Figure 3:
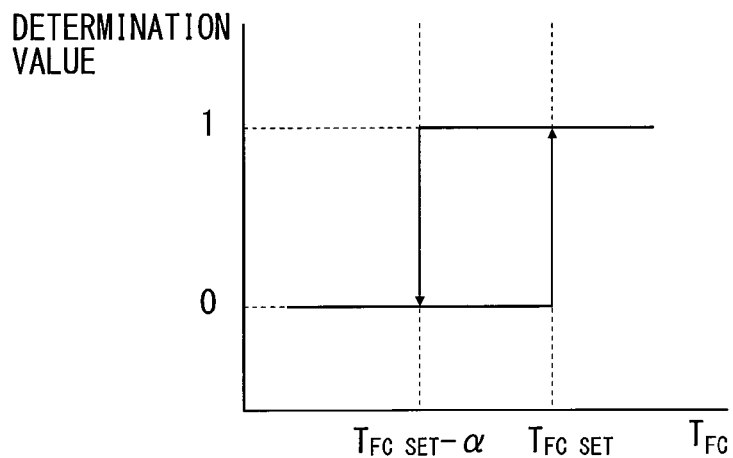
FIG. 3 is a determination map for determining whether it is possible to heat the cooling water.

Next, the control device 140 performs a heating operation control based on the control flow chart shown in FIG. 2. That is, the control device 140 obtains the cooling water temperature $T_{FC}$ outputted from the water temperature sensor 119 at Step S100. Next, the control device 140 determines whether heating operation using the heater core 116 is possible or not, at Step S110, based on the cooling water temperature $T_{FC}$ with reference to the determination map of FIG. 3.

Here, the determination map is used for determining whether heating operation using the heater core 116 is possible or not based on a predetermined temperature (heating possible temperature $T_{FC\ SET}$ or heating possible temperature $T_{FC\ SET}-\alpha$) with respect to the cooling water temperature $T_{FC}$, which is changing. That is, in the determination map, it is determined that heating is possible (determination value is set as 1) when the cooling water temperature $T_{FC}$ becomes higher than or equal to the heating possible temperature $T_{FC\ SET}$ while the cooling water temperature $T_{FC}$ is raised from the low temperature side. Further, it is determined that heating is impossible (determination value is set as 0) when the cooling water temperature $T_{FC}$ becomes lower than or equal to the heating possible temperature $T_{FC\ SET}-\alpha$ while the cooling water temperature $T_{FC}$ is lowered from the high temperature side. $\alpha$ is a constant defined beforehand in order not to start hunching between the determination value 1 and the determination value 0. The heating possible temperature $T_{FC\ SET}$ is, for example, 65° C., and the constant $\alpha$ is, for example, 5° C. (the heating possible temperature $T_{FC\ SET}-\alpha=60°$ C.).

When the control device 140 determines that the heating is possible by using the cooling water (determination value=1) at Step S110, the control device 140 will progress to Step S120. At Step S120, the control device 140 opens the passage having the heater core 116, and closes the bypass channel 117, in the cooling circuit 110, by controlling the switch valve 118. Moreover, the switch valve 115 is controlled to switch the passage according to the cooling water temperature $T_{FC}$.

Then, in the cooling circuit 110, the cooling water flows in order of the fuel cell 111, the pump 112, the bypass channel 114 (or the radiator 113 depending on the state of the switch valve 115), the heater core 116, and the fuel cell 111. Here, the heat of the cooling water is mainly emitted to the air for air-conditioning in the heater core 116, such that the fuel cell 111 is maintained to be cooled to have the constant temperature.

Then, the control device 140 performs cooperative operation control with both the heat pump (the indoor heat exchanger 122) and the heater core 116 at Step S130. That is, the control device 140 controls the first throttle 123 to have the predetermined throttle degree, opens the shut valve 129, and activates the compressor 121 and the electric fans 124*a* and 124*b*, in the heat pump cycle 120.

Figure 4:
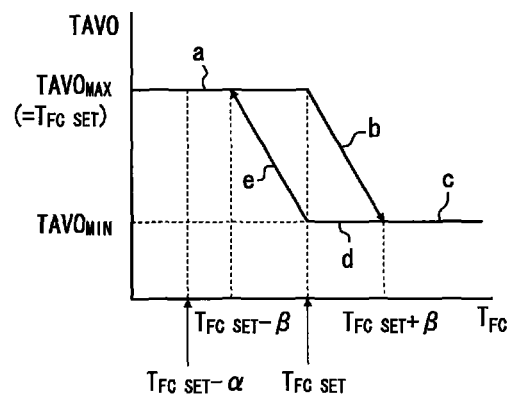
FIG. 4 is a determination map for determining a target value of blow-off air temperature when a cooperative control operation is executed.

Furthermore, at Step S130, the control device 140 determines a target value TAVO of the blow-off temperature (corresponding to a target heating temperature of the present disclosure) of the air for air-conditioning heated by the indoor heat exchanger 122 based on the determination map shown in FIG. 4.

Here, the target value TAVO of the blow-off temperature is a desired value for a temperature of the air for air-conditioning heated by the indoor heat exchanger 122. In the determination map, the target value TAVO of the blow-off temperature is beforehand set to correspond to the cooling water temperature $T_{FC}$ which is changing. The target value TAVO of the blow-off temperature is set to be a fixed value (a in FIG. 4), while the cooling water temperature $T_{FC}$ is raised from the low temperature side to reach the heating possible temperature $T_{FC\ SET}$. The fixed value is the maximum value $TAVO_{MAX}$ set up as the maximum for the target value TAVO of the blow-off temperature. Here, the value of the maximum value $TAVO_{MAX}$ is set up to be equal to the value (65° C.) of the heating possible temperature $T_{FC\ SET}$.

Then, when the cooling water temperature $T_{FC}$ becomes higher than the heating possible temperature $T_{FC\ SET}$, in a predetermined range ($\beta$) of the cooling water temperature $T_{FC}$, the target value TAVO of the blow-off temperature is set up to become lower as the cooling water temperature $T_{FC}$ becomes higher (b in FIG. 4). The predetermined range ($\beta$) of the cooling water temperature $T_{FC}$ corresponds to a first predetermined temperature range ($\beta$) of the present disclosure. When the cooling water temperature $T_{FC}$ becomes higher than the cooling water temperature $T_{FC\ SET}+\beta$, the target value TAVO of the blow-off temperature is set up to be a fixed value (c in FIG. 4) again. The fixed value is the minimum value $TAVO_{MIN}$ set up as the minimum value for the target value TAVO of the blow-off temperature.

Moreover, while the cooling water temperature $T_{FC}$ is lowered from the high temperature side to reach the heating possible temperature $T_{FC\ SET}$, the target value TAVO of the blow-off temperature is set up to be fixed (c, d in FIG. 4) as the minimum value $TAVO_{MIN}$.

Then, when the cooling water temperature $T_{FC}$ becomes lower than the heating possible temperature $T_{FC\ SET}$, in a predetermined range ($-\beta$) of the cooling water temperature $T_{FC}$, the target value TAVO of the blow-off temperature is set up to become higher as the cooling water temperature $T_{FC}$ becomes lower (e in FIG. 4). The predetermined range ($-\beta$) of the cooling water temperature $T_{FC}$ corresponds to a second predetermined temperature range ($-\beta$) of the present disclosure. When the cooling water temperature $T_{FC}$ becomes lower than or equal to the cooling water temperature $T_{FC\ SET}-\beta$, the target value TAVO of the blow-off temperature is set up to be a fixed value (a in FIG. 4) which is the maximum value $TAVO_{MAX}$. $\beta$ is a constant set beforehand in order not to start hunching while the cooling water temperature $T_{FC}$ is raised or lowered. The constant $\beta$ is set up to be smaller than the constant $\alpha$ in the determination map ($\alpha > \beta$).

In addition, the control device 140 controls the pressure or the flow rate of the refrigerant discharged by the compressor 121 in a manner that the temperature of the air for air-conditioning passing the indoor heat exchanger 122 becomes close to the target value TAVO of the blow-off temperature set up on the determination map.

The control device 140 executes the cooperative operation control using both the heater core 116 and the indoor heat exchanger 122 by setting the target value $TAVO_{MAX}$ according to the cooling water temperature $T_{FC}$ using the above determination map. For example, when the cooling water temperature $T_{FC}$ is raised to be higher than the heating possible temperature $T_{FC\ SET}$, the control device 140 heats the air for air-conditioning by using the cooling water which flows through inside of the heater core 116, and complements the insufficiency in heat of the heater core 116 by using heat of the indoor heat exchanger 122. That is, since the heating capability with the heater core 116 becomes higher as the cooling water temperature $T_{FC}$ becomes higher, the target value TAVO of the blow-off temperature is set to be lower in the indoor heat exchanger 122 by the increase in the heating capability. Thus, the complement by the indoor heat exchanger 122 is made smaller, and the load of the heater pump cycle 120 (load of the compressor 121) is made smaller, such that the air for air-conditioning is heated. At this time, the temperature of the air for air-conditioning is adjusted by the air mixing door 134.

On the contrary, while the cooling water temperature $T_{FC}$ is lowered to be lower than the heating possible temperature $T_{FC\ SET}$ and is further lowered to reach the heating possible temperature $T_{FC\ SET}-\alpha$, the air heating capability of the heater core 116 becomes small, so the control device 140 complements the insufficiency in the heat of the heater core 116 by using heat of the indoor heat exchanger 122. That is, since the heating capability with the heater core 116 becomes smaller as the cooling water temperature $T_{FC}$ becomes lower, the target value TAVO of the blow-off temperature is set to be higher in the indoor heat exchanger 122 by the decrease in the heating capability. Thus, the complement by the indoor heat exchanger 122 is enlarged, and the air for air-conditioning is heated by utilizing the capability of the heat pump cycle 120. At this time, the temperature of the air for air-conditioning is adjusted by the air mixing door 134.

On the other hand, when the control device 140 determines that the heating by using the cooling water is impossible (determination value=0) at Step S110, the control device 140 will progress to Step S140. At Step S140, the control device 140 closes the passage having the heater core 116, and opens the bypass channel 117, in the cooling circuit 110, by controlling the switch valve 118. Moreover, the switch valve 115 is controlled to switch the passage according to the cooling water temperature $T_{FC}$.

Then, in the cooling circuit 110, the cooling water flows in order of the fuel cell 111, the pump 112, the bypass channel 114 (or the radiator 113 depending on the state of the switch valve 115), the bypass channel 117, and the fuel cell 111, such that the fuel cell 111 is maintained to be cooled to have a constant temperature.

Then, at Step S150, the control device 140 performs a sole operation control using only the heat pump cycle 120 (indoor heat exchanger 122). Namely, in the heat pump cycle 120, the control device 140 controls the first throttle 123 to have the predetermined throttle degree, opens the shut valve 129, and activates the compressor 121 and the electric fans 124a and 124b.

Then, in the heat pump cycle 120, refrigerant flows in order of the compressor 121, the indoor heat exchanger 122, the first throttle 123, the outdoor heat exchanger 124, the shut valve 129, the accumulator 127, and the compressor 121.

At the time of the sole operation of Step S150, the air mixing door 134 is rotated to mainly close the bypass channel 133, so most of the air for air-conditioning passes the indoor heat exchanger 122, and the air for air-conditioning is heated with the high-temperature and high-pressure refrigerant which flows inside of the indoor heat exchanger 122. In the indoor heat exchanger 122, the target value TAVO of the blow-off temperature is set to the maximum value $TAVO_{MAX}$, and the air for air-conditioning is heated. Moreover, the refrigerant which flows out of the indoor heat exchanger 122 to be decompressed by the first throttle 123 absorbs heat from the air for heat exchange in the outdoor heat exchanger 124. Thus, in case where the cooling water temperature $T_{FC}$ is lower than the heating possible temperature $T_{FC\ SET}$ of the heater core 116 and the indoor heat exchanger 122, only the indoor heat exchanger 122 is used for the heating operation. At this time, the temperature of the air for air-conditioning is adjusted with the air mixing door 134.

Next, operation at the time of warm-up operation is explained.

Even if the cooling water temperature $T_{FC}$ is lower than the heating possible temperature $T_{FC\ SET}$ at the time of the heating operation, the control device 140 makes the cooling water to flow into the heater core 116 until the cooling water temperature $T_{FC}$ reaches the cooling water temperature $T_{FC\ SET}$–α. At this time, in the determination map, as shown by the double line in FIG. 5, the target value TAVO of the blow-off temperature becomes higher than the cooling water temperature $T_{FC}$ in an area (upper than the dashed line where $TAVO=T_{FC}$). In this area, the temperature of the air for air-conditioning heated by the indoor heat exchanger 122 becomes higher than the cooling water temperature $T_{FC}$. In this case, the cooling water is heated by the air for air-conditioning heated by the indoor heat exchanger 122. In other words, because the cooling water temperature $T_{FC}$ is lower than the target value TAVO of the blow-off temperature ($T_{FC}$<TAVO), the cooling water temperature $T_{FC}$ is raised by the emitted air for air-conditioning. That is, the cooling water of the heater core 116 is positively warmed by the indoor heat exchanger 122.

As mentioned above, in this embodiment, at the time of heating operation, the control device 140 changes the target value TAVO of the blow-off temperature according to the cooling water temperature $T_{FC}$. Specifically, when the cooling water temperature $T_{FC}$ is higher than the heating possible temperature $T_{FC\ SET}$, the control device 140 lowers the target value TAVO of the blow-off temperature as the cooling water temperature $T_{FC}$ becomes higher. Further, when the cooling water temperature $T_{FC}$ is lower than the heating possible temperature $T_{FC\ SET}$, the control device 140 raises the target value TAVO of the blow-off temperature as the cooling water temperature $T_{FC}$ becomes lower.

Thereby, when the cooling water temperature $T_{FC}$ is higher than the heating possible temperature $T_{FC\ SET}$, the control device 140 lowers the target value TAVO of the blow-off temperature as the cooling water temperature $T_{FC}$ becomes higher. Thus, the heating capability of the heater core 116 is mainly utilized, and only the insufficiency is complemented by the indoor heat exchanger 122. Accordingly, the needed heating performance can be secured by the heater core 116 and the indoor heat exchanger 122.

On the contrary, when the cooling water temperature $T_{FC}$ is lower than the heating possible temperature $T_{FC\ SET}$, the control device 140 raises the target value TAVO of the blow-off temperature as the cooling water temperature $T_{FC}$ becomes lower. Thus, the insufficiency is complemented by the indoor heat exchanger 122 while the heating capability acquired by the heater core 116 is utilized as it is. Accordingly, it becomes possible to secure the needed heating performance by the heater core 116 and the indoor heat exchanger 122.

Therefore, it is enough for the heater core 116 to heat the air for air-conditioning by an amount corresponding to the cooling water temperature $T_{FC}$, so it is unnecessary to emit excessive heat from the cooling water for the heating operation, such that the cooling water temperature $T_{FC}$ can be kept constant. That is, the temperature of the fuel cell 111 can be kept constant.

Thus, the target value TAVO of the blow-off temperature is changed according to the cooling water temperature $T_{FC}$, thereby securing the needed heating performance by two heating portions, i.e., the heater core 116 and the indoor heat exchanger 122. Therefore, the structure can be made simple compared with Patent document 2 where three heating portions (two indoor units for heating and one heater core) are needed.

Therefore, suitable air-conditioning is enabled with the simple composition, using effectively small amount of waste heat in the fuel cell 111, and the temperature of the fuel cell 111 can be kept constant by the air-conditioner 100.

Moreover, when the cooling water temperature $T_{FC}$ is lower than the heating possible temperature $T_{FC\ SET}$ (or the heating possible temperature $T_{FC\ SET}$–α), the control device 140 makes the cooling water to flow through the bypass channel 117, thereby performing the sole operation control using only the heat pump cycle 120 (indoor heat exchanger 122).

Thereby, since the cooling water does not flow through the heater core 116, the air for air-conditioning is heated only by the indoor heat exchanger 122. Therefore, heat of the cooling water is not emitted to the air for air-conditioning from the heater core 116, such that the temperature of cooling water can be kept constant. That is, the temperature of the fuel cell 111 can be kept constant.

Figure 5:
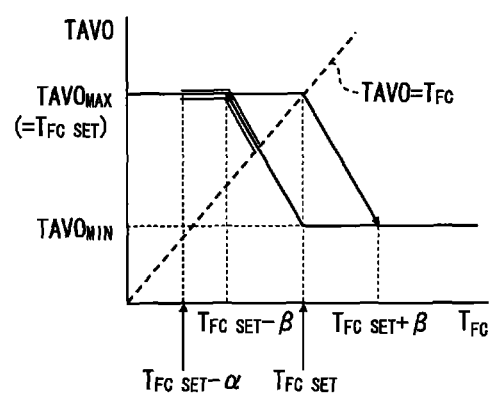
FIG. 5 is a determination map for determining a target value of blow-off air temperature at a warm-up operation.

Moreover, when the cooling water temperature $T_{FC}$ is lower than the heating possible temperature $T_{FC\ SET}$, the control device 140 sets the target value TAVO of the blow-off temperature as a value higher than the cooling water temperature $T_{FC}$ (double line part in FIG. 5).

Thereby, the temperature of the air for air-conditioning heated by the indoor heat exchanger 122 always becomes higher than the cooling water temperature $T_{FC}$. Therefore, the cooling water in the heater core 116, which is located downstream side of the indoor heat exchanger 122 in the flow of air for air-conditioning, can be heated with the air for air-conditioning heated by the indoor heat exchanger 122. That is, when the cooling water temperature $T_{FC}$ is lower than the heating possible temperature $T_{FC\ SET}$, the low-temperature cooling water can be positively heated, securing heating performance.

In addition, in the determination map explained with reference to FIG. 4, when the cooling water temperature $T_{FC}$ becomes higher than the heating possible temperature $T_{FC\ SET}$, the target value TAVO of the blow-off temperature is set to be lower as the cooling water temperature $T_{FC}$ becomes higher in the predetermined range (β) of the cooling water temperature $T_{FC}$. In the range where the cooling water temperature $T_{FC}$ becomes higher than or equal to the cooling water temperature $T_{FC\ SET}+\beta$, the target value TAVO of the blow-off temperature is set to be constant as the minimum value $TAVO_{MIN}$. Moreover, when the cooling water temperature $T_{FC}$ becomes lower than the heating possible temperature $T_{FC\ SET}$, the target value TAVO of the blow-off temperature is set to become higher as the cooling water temperature $T_{FC}$ becomes lower in the predetermined range (β) of the cooling water temperature $T_{FC}$. In the range where the cooling water temperature $T_{FC}$ becomes lower than or equal to the cooling water temperature $T_{FC\ SET}-\beta$, the target value TAVO of the blow-off temperature is set to be constant as the maximum value $TAVO_{MAX}$.

However, the predetermined range of the cooling water temperature $T_{FC}$ (β, −β) may not be set, without being limited to the above. When the cooling water temperature $T_{FC}$ becomes higher than the heating possible temperature $T_{FC\ SET}$, the target value TAVO of the blow-off temperature may be lowered toward the minimum value $TAVO_{MIN}$, as the cooling water temperature $T_{FC}$ becomes higher. When the cooling water temperature $T_{FC}$ becomes lower than the heating possible temperature $T_{FC\ SET}$, the target value TAVO of the blow-off temperature may be raised toward the maximum value $TAVO_{MAX}$, as the cooling water temperature $T_{FC}$ becomes lower.

Second Embodiment

Figure 6:
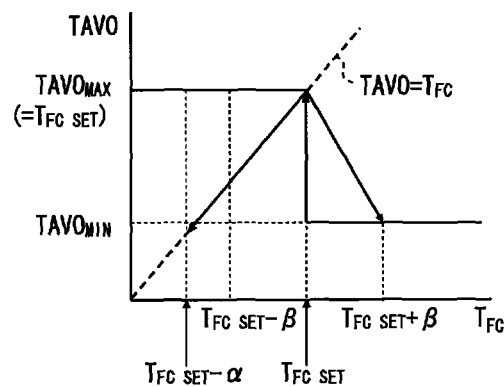
FIG. 6 is a determination map for determining a target value of blow-off air temperature according to a second embodiment.

A determination map of a second embodiment is shown in FIG. 6. The determination map is modified in the second embodiment, compared with the first embodiment.

As shown in FIG. 6, in the determination map, when the cooling water temperature $T_{FC}$ becomes lower than the heating possible temperature $T_{FC\ SET}$, the target value TAVO of the blow-off temperature is set as the same value as the cooling water temperature $T_{FC}$ by the control device 140.

Thereby, when the cooling water temperature $T_{FC}$ is lower than the heating possible temperature $T_{FC\ SET}$, there is no difference between the temperature of the air for air-conditioning heated by the indoor heat exchanger 122 and the cooling water temperature $T_{FC}$ in the heater core 116.

Therefore, the heat of the cooling water in the heater core 116 is not emitted to the air for air-conditioning, and the heat of cooling water can be maintained in the cooling circuit 110. That is, the temperature of the fuel cell 111 can be kept constant.

Third Embodiment

Figure 7:
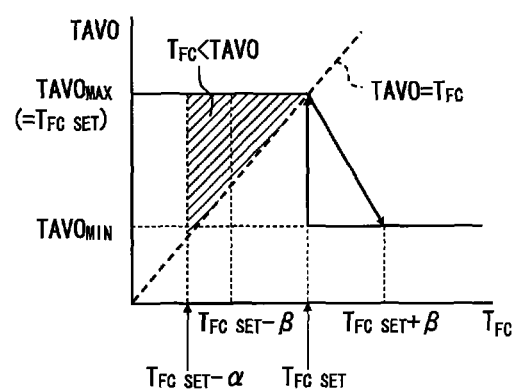
FIG. 7 is a determination map for determining a target value of blow-off air temperature according to a third embodiment.

A determination map of a third embodiment is shown in FIG. 7. The determination map is modified in the third embodiment, compared with the first embodiment.

As shown in FIG. 7, in the determination map, when the cooling water temperature $T_{FC}$ becomes lower than the heating possible temperature $T_{FC\ SET}$, the target value TAVO of the blow-off temperature is set as a value higher than the cooling water temperature $T_{FC}$ by the control device 140. Specifically, the target value TAVO of the blow-off temperature is set as a value in the hatched area shown in FIG. 7.

Thereby, similar to the double line part explained with reference to FIG. 5 in the first embodiment, when the cooling water temperature $T_{FC}$ is lower than the heating possible temperature $T_{FC\ SET}$, the temperature of the air for air-conditioning heated by the indoor heat exchanger 122 always becomes higher than the cooling water temperature $T_{FC}$. Therefore, the cooling water in the heater core 116 which is located downstream side of the indoor heat exchanger 122 in the flow of air for air-conditioning can be heated with the air for air-conditioning heated by the indoor heat exchanger 122. Thus, the low-temperature cooling water can be positively warmed.

Other Embodiment

Although the cooling circuit 110 is explained as an example of a circuit which cools the fuel cell 111 in the first embodiment, the cooling circuit 110 is not limited to this and may be a circuit which cools the engine of the hybrid car.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. An air-conditioner for a vehicle comprising:
a heater core which heats air for air-conditioning by using cooling water of a cooling circuit which cools a fuel cell of a fuel-cell vehicle as a heat source;
a heat exchanger arranged upstream of the heater core in a flow direction of the air for air-conditioning, the heat exchanger heating the air for air-conditioning by using refrigerant which flows through a heat pump cycle as a heat source; and
a control part which controls operation of the heat pump cycle by executing a cooperative operation control using both the heater core and the heat exchanger in a manner that a target temperature of the air for air-conditioning heated by the heat exchanger is changed in accordance with a temperature of the cooling water, wherein
when the temperature of the cooling water is higher than a heating possible temperature, the control part lowers the target temperature as the temperature of the cooling water becomes higher at least in a first predetermined temperature range, when the temperature of the cooling water is lower than the heating possible temperature, the control part raises the target temperature as the temperature of the cooling water becomes lower at least in a second predetermined temperature range, and when the target temperature becomes higher than the heating possible temperature, the control part controls the cooling water to be heated by the air for air-conditioning heated by the heat exchanger.

2. The air-conditioner according to claim 1, wherein
the cooling circuit has a bypass channel through which the cooling water bypasses the heater core, and
the control part controls the cooling water to flow through the bypass channel, when the temperature of the cooling water is lower than the heating possible temperature at which the heater core is possible to perform a heating operation.

3. The air-conditioner according to claim 1, wherein
the control part sets the target temperature to be the same value as the temperature of the cooling water when the temperature of the cooling water is lower than the heating possible temperature at which the heater core is possible to perform a heating operation.

4. The air-conditioner according to claim 1, wherein
the control part sets the target temperature to be higher than the temperature of the cooling water when the temperature of the cooling water is lower than the heating possible temperature at which the heater core is possible to perform a heating operation.

5. The air-conditioner according to claim 1, wherein
the control part sets the target temperature to be lower than the heating possible temperature when the temperature of the cooling water is higher than the heating possible temperature.

6. The air-conditioner according to claim 1, wherein
the control part is configured to
compare the temperature of the cooling water with the heating possible temperature, and
compare the target temperature of the air for air-conditioning heated by the heat exchanger with the heating possible temperature.

7. The air-conditioner according to claim 1, wherein
only the heat exchanger is used for a heating operation when the temperature of the cooling water is lower than the heating possible temperature.

* * * * *